(12) United States Patent
Bell et al.

(10) Patent No.: US 9,132,369 B2
(45) Date of Patent: Sep. 15, 2015

(54) WATER FILTER HOUSING SIEVE

(71) Applicant: Brita LP, Oakland, CA (US)

(72) Inventors: Russell E. Bell, Pleasanton, CA (US); Allison Jean Fretwell, San Francisco, CA (US); Gregory Martin Gressel, Hershey, PA (US); Ronald Alfred Kolberg, Pleasanton, CA (US)

(73) Assignee: Brita LP, Oakland, CA (US)

( * ) Notice: Subject to any disclaimer, the term of this patent is extended or adjusted under 35 U.S.C. 154(b) by 329 days.

(21) Appl. No.: 13/743,857

(22) Filed: Jan. 17, 2013

(65) Prior Publication Data

US 2014/0027368 A1 Jan. 30, 2014

Related U.S. Application Data

(60) Provisional application No. 61/588,829, filed on Jan. 20, 2012.

(51) Int. Cl.
*B01D 35/30* (2006.01)
*C02F 1/00* (2006.01)
*C02F 1/28* (2006.01)

(52) U.S. Cl.
CPC ............... *B01D 35/30* (2013.01); *C02F 1/003* (2013.01); *B01D 2201/301* (2013.01); *C02F 1/283* (2013.01); *C02F 2201/006* (2013.01); *C02F 2307/04* (2013.01)

(58) Field of Classification Search
None
See application file for complete search history.

(56) References Cited

U.S. PATENT DOCUMENTS

| | | | |
|---|---|---|---|
| 4,895,648 A | 1/1990 | Hankammer | |
| 4,969,996 A | 11/1990 | Hankammer | |
| D312,863 S | 12/1990 | Hankammer | |
| 4,978,449 A * | 12/1990 | Devine et al. | 210/264 |
| 5,049,272 A | 9/1991 | Nieweg | |
| 5,980,743 A | 11/1999 | Bairischer | |
| 6,012,232 A | 1/2000 | Weyrauch | |
| 6,042,725 A | 3/2000 | Serenko et al. | |
| D435,084 S | 12/2000 | Northern et al. | |
| 6,387,260 B1 | 5/2002 | Pimenov et al. | |
| 6,405,875 B1 | 6/2002 | Cutler | |
| 6,454,941 B1 | 9/2002 | Cutler et al. | |
| 6,458,303 B1 | 10/2002 | Fuehrer et al. | |
| 6,524,477 B1 | 2/2003 | Hughes | |
| 6,638,426 B1 * | 10/2003 | Fritter et al. | 210/266 |
| 6,841,067 B1 * | 1/2005 | Hofmann et al. | 210/266 |
| 7,387,729 B2 | 6/2008 | Vanderbelt et al. | |
| D590,475 S | 4/2009 | Bell et al. | |
| 7,695,615 B2 | 4/2010 | Vinogradova et al. | |
| 2009/0200229 A1 | 8/2009 | Gross et al. | |
| 2011/0005991 A1 | 1/2011 | Merz et al. | |
| 2011/0089103 A1 | 4/2011 | Bommi et al. | |
| 2011/0259207 A1 * | 10/2011 | Ozanne et al. | 99/323.3 |

FOREIGN PATENT DOCUMENTS

WO WO9610676 A 4/1996

* cited by examiner

*Primary Examiner* — Benjamin Kurtz
(74) *Attorney, Agent, or Firm* — Stacy H. Combs; Thomas C. Feix

(57) ABSTRACT

A gravity flow water filtration cartridge with a novel sieve system. The sieve system comprises an air vent and a shroud. The sieve system is attached or welded onto a housing bottom or barrel. An air permeable material covers the opening of the air vent.

10 Claims, 8 Drawing Sheets

WATER FILTER HOUSING SIEVE

CROSS REFERENCE TO RELATED APPLICATIONS

This application claims the benefit of U.S. Provisional Application No. 61/588,829, filed on Jan. 20, 2012, which is hereby incorporated by reference in its entirety.

FIELD OF INVENTION

The present invention relates to a water filtration cartridge, in which a novel sieve system has been developed to enable use of finer carbon particles to improve water contaminant removal capability, provide a path for air off-gassed during initial carbon wetting and filtering of water, and enable use of easy insertion and removal of the cartridge.

BACKGROUND OF THE INVENTION

The invention disclosed herein generally embodies a gravity flow water filtration cartridge with a novel sieve system. The water filtration cartridge is to be used with any known water filtration device. Examples of such devices include gravity flow systems, such as pour-through pitchers, filtering water bottle, countertop system.

Pour-through pitcher systems typically include an upper reservoir for receiving unfiltered water, a lower reservoir for receiving and storing filtered water, and a filtration cartridge with an inlet at its top and outlet at its bottom, through which cartridge, water flows from the upper reservoir to the lower reservoir. Countertop systems typically include a larger rectangular tank with a spigot for draining filtered water into a glass or pan. Both pitcher and countertop systems use gravity to move the unfiltered water in the top reservoir down through a water filtration cartridge and into the lower reservoir where the filtered water remains until it is used.

The water filtration cartridge typically employed in a gravity flow system is composed of a sieve system and a housing bottom, such as a barrel. The barrel is filled with filtration media and the sieve system is sealed to the barrel. The filtration media is typically granular, such as activated carbon. Other components may be combined to enhance water filtration capability, such as ion exchange resin, zeolite, ceramics, and others known in the art.

A problem associated with using granular filtration media in such a gravity flow cartridge, is that air gets trapped in-between the particles of filtration media and in the headspace of the cartridge barrel. The "headspace" is the area above the fill line of the filtration media and up to the bottom of the sieve system. This air must be vented from the cartridge as water is filtered or water flow will be slow or completely stop. In prior art systems, the air in the water filtration cartridge is expelled through vents in the top of the filter. The size of the vents is critical. The vent size must be small enough to contain the carbon in the filter and big enough to allow the air to escape. Prior art systems have large vent holes to properly vent the air, and thus, are limited to a minimum carbon particle size.

Prior art water filtration cartridges typically employ granular filtration media the size of about 18×40 U.S. mesh (1000 μm to 425 μm). This size range has limited contaminant removal capability due to particle size and packing geometry of the granules. Better filtration capability can be achieved using smaller size filtration media, such as 20×80 U.S. mesh (850 μm to 180 μm). However, smaller media is difficult to retain in the cartridge housing. The smaller media is typically swept out of the cartridge through the air vent holes in the cap and ends up in the un-filtered water of the upper reservoir.

It would be useful to have a gravity flow water filtration cartridge that exhibits both good water flow rates and high containment reduction.

SUMMARY OF THE INVENTION

In one embodiment, there is a gravity flow water filtration cartridge with a novel sieve system. The sieve system comprises an air vent and a shroud. The sieve system is attached or welded onto a housing bottom or barrel. An air permeable material covers the opening of the air vent.

In another embodiment, there is a water filter housing cartridge comprising a top portion comprised of a sieve system comprising, a shroud with water inlet holes and a vent piece including an air vent tube with an opening at the top and connected to and adjacent a base portion with water inlet holes located on said base portion and a bottom portion comprised of a barrel. The cartridge is a gravity flow water filter housing cartridge.

In another embodiment, the air permeable material is selected from the group consisting of a screen, a woven, a nonwoven or a membrane covers the opening of the vent tube. In another embodiment, the air permeable membrane is hydrophobic.

In another embodiment, the shroud water inlet holes are located on a peripheral top portion of the shroud. In another embodiment, the shroud includes a flange and a second set of water inlet holes adjacent the flange. In another embodiment, the shroud further comprises a handle with a thumb rest and handle drainage holes. In yet another embodiment, the shroud and vent piece are made of a material selected from polypropylene, polyethylene and PVC. In another embodiment, the base portion of the vent piece water inlet holes are covered by a material selected from a screen or nonwoven. In another embodiment, the base portion is a disk like shape.

In yet another embodiment, the water filter cartridge is installed in a water pitcher. In another embodiment, the barrel is filled with activated carbon.

In another embodiment, there is a process of filtering water in a gravity flow water filtration device comprising a) obtaining a water filter housing cartridge comprising i) a top portion comprised of a sieve system comprising, a shroud with water inlet holes; and a vent piece including an air vent tube with an opening at the top and connected to and adjacent a disk like base portion with water inlet holes located on said base portion and ii) a bottom portion comprised of a barrel. Filling said cartridge with a filtration material, assembling said cartridge by connecting the top portion to the bottom portion and wherein air is trapped in a headspace above the filtration material and d) installing said cartridge in a gravity flow water filtration device, wherein said water enters the cartridge through the shroud inlet holes and the air in the headspace vents through the vent tube. Air may further be routed downwardly by the side walls of the shroud and finally exit via the inlet holes 13, 17.

Further features and advantages of the present invention will become apparent to those of ordinary skill in the art in view of the detailed description of preferred embodiments below, when considered together with the attached claims.

BRIEF DESCRIPTION OF THE DRAWINGS

The foregoing aspects and others will be readily appreciated by the skilled artisan from the following description of the illustrative embodiments when read in conjunction with the accompanying drawings, wherein.

Reference will now be made to the drawings wherein like numerals refer to like parts throughout. As used herein, positional terms, such as "bottom" and "top" and the like, and directional terms, such as "up", "down" and the like, are employed for ease of description in conjunction with the drawings. None of these terms is meant to indicate that the described components must have a specific orientation except when specifically set forth.

DETAILED DESCRIPTION

Before describing the embodiments in detail, it is to be understood that this invention is not limited to particularly exemplified structures, systems or system parameters, as such may, of course, vary. It is also to be understood that the terminology used herein is for the purpose of describing particular embodiments of the invention only, and is not intended to be limiting.

As will be appreciated by one having ordinary skill in the art, the gravity flow filters described herein have many advantages.

In describing the embodiments of the present invention, the following terms will be employed, and are intended to be defined as indicated below.

The term "activated carbon," as used herein, means highly porous carbon having a random or amorphous structure. The term "activated carbon" thus includes, but is not limited to, carbon derived from bituminous or other forms of coal, pitch, bones, nut shells, coconut shells, corn husks, polyacrylonitrile (PAN) polymers, charred cellulosic fibers or materials, wood, and the like. The carbon may be impregnated or chemically altered my any means known in the art.

The term "gravity flow" refers to the natural downward flow of water aided by gravity alone.

The term "incorporating," as used herein, means including, such as including a functional element of a device, apparatus or system. Incorporation in a device may be permanent, such as a non-removable filter cartridge in a disposable water filtration device, or temporary, such as a replaceable filter cartridge in a permanent or semi-permanent water filtration device.

In general, water moves through gravity flow water filters with head pressures less than 1 psi. Good flow rates for gravity flow water filters with head pressures in this range are rates faster than about 0.20 liters/min (or about 0.05 gallons/min). In general, conventional, loose media, gravity flow carbon filters have flow rates between about 0.125 liters/minute and 0.250 liters/minute.

Figure 1:
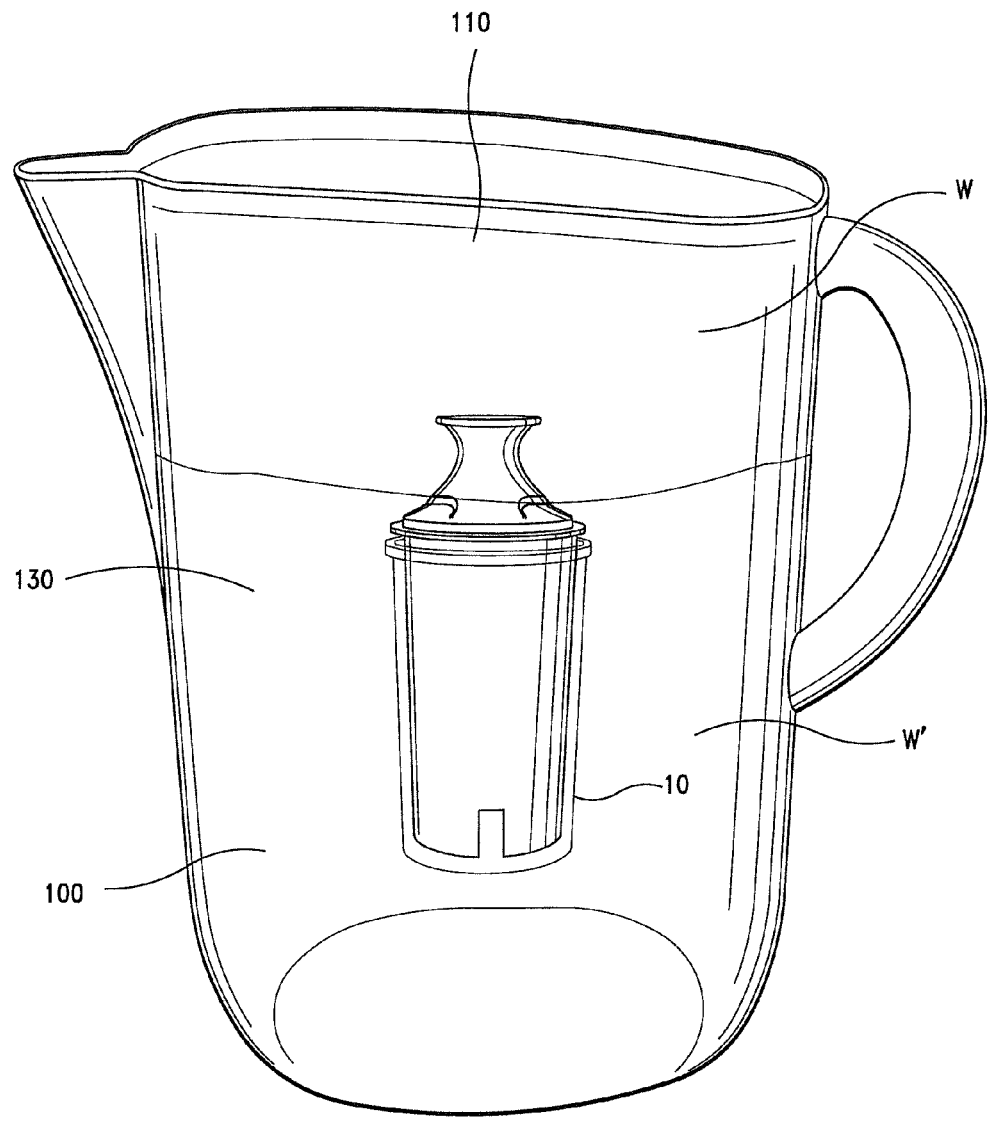
FIG. 1: Water filtration cartridge installed in a water pitcher system
Figure 2:
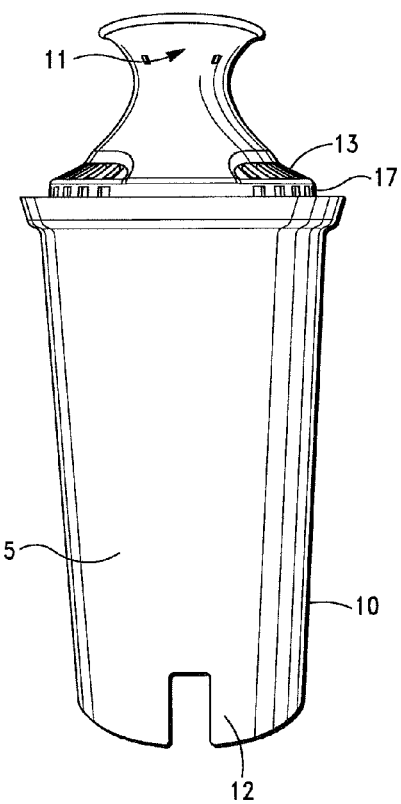
FIG. 2: Water filtration cartridge

Referring to FIGS. 1-2, there is a water filter cartridge 10 installed in a pour-through water pitcher 100. The water filter cartridge 10 includes a top portion or sieve system 24 and a bottom portion or barrel 12. The shroud 11 may be made of one piece of material. Alternatively, the shroud 11 may be made of one or more pieces. The barrel 12 includes a cavity 5 that is filled with filtration media. The shroud 11 is sealed to the barrel 12 in a water tight manner.

In operation, source water W flows from upper reservoir 110 to lower reservoir 130 and is channeled through a plurality of water inlets 13, 17 on the shroud 11 of the cartridge 10. Water then flows through the cavity 15 of the barrel 12 through the filtration media. Inorganic and organic contaminants are removed from the source water W, as the source water W moves through the activated carbon, thus transforming the source water W into filtered water W'. The filtered water W' flows from the cavity 5 of the barrel 12 and out through the bottom of the filter cartridge 10 and into the lower reservoir 130 of the pitcher.

Although a pour-through pitcher has been used to illustrate use of the water filter cartridge 10, the water filter cartridge 10 can be employed in combination with any water pitcher, bottle, carafe, tank, or other gravity-flow filtration system. The embodiments of the invention should thus not be construed as being limited in scope to filtering water only in pour-through pitchers.

Referring to FIGS. 3-8, there is a sieve system 24 on the water filter cartridge 10. The sieve system 24 is comprised of the shroud 11 and a vent piece 14. The shroud 11 is designed to enable use of easy insertion and removal of the water filter cartridge 10. The shroud is also designed to vent air out of the vent piece 14 and into the upper reservoir 110 of the water pitcher 100. The shroud 11 comprises a handle 15, a flange 16 and shroud water inlet holes 13 located on a peripheral top portion of the shroud 11. The water inlet holes 13 drain water from the pitcher's upper reservoir 110 into the water filter cartridge 10. A second set of water inlet holes 17 are positioned adjacent the flange 16 on the shroud 11. The inlets 17 function to drain water from the upper reservoir 110 and they also drain water that would otherwise be left sitting on the flange 11 after water has drained into the filter cartridge 10. Standing water could create the potential for bacteria and other microorganisms to grow.

The water filter housing barrel 12 and sieve system 24 can be made of the same material or different. Exemplary materials are polypropylene, polyethylene, and PVC.

Figure 3:
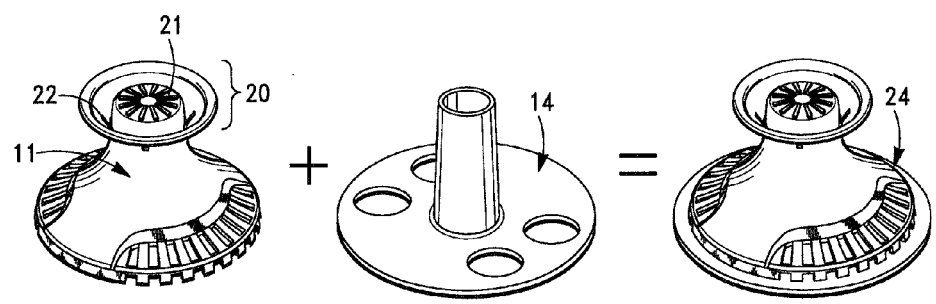
FIG. 3: Sieve System: Shroud and Vent Piece
Figure 4:
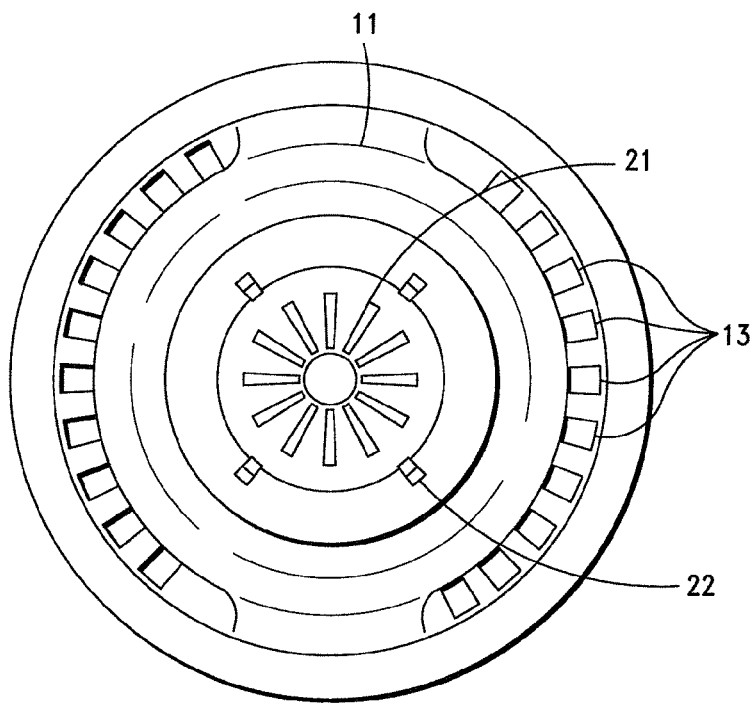
FIG. 4: Top View of Sieve System Assembled (including vent piece)
Figure 5:
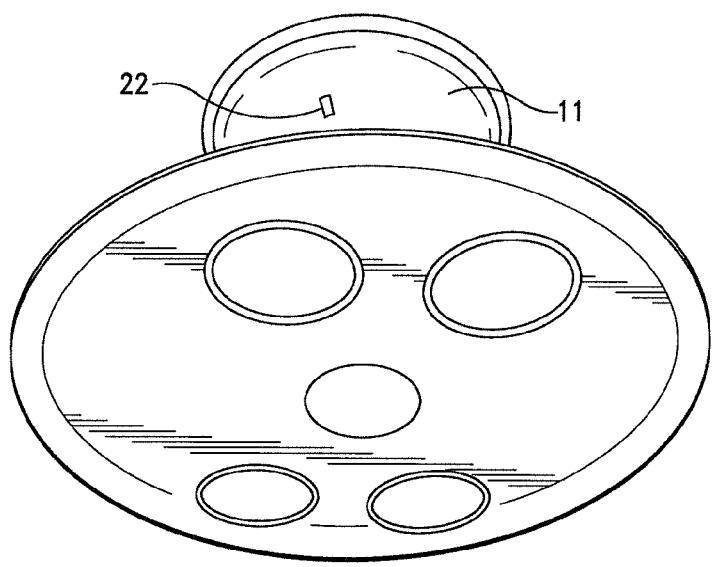
FIG. 5: Bottom Perspective View of Sieve System Assembled (including vent piece)
Figure 6:
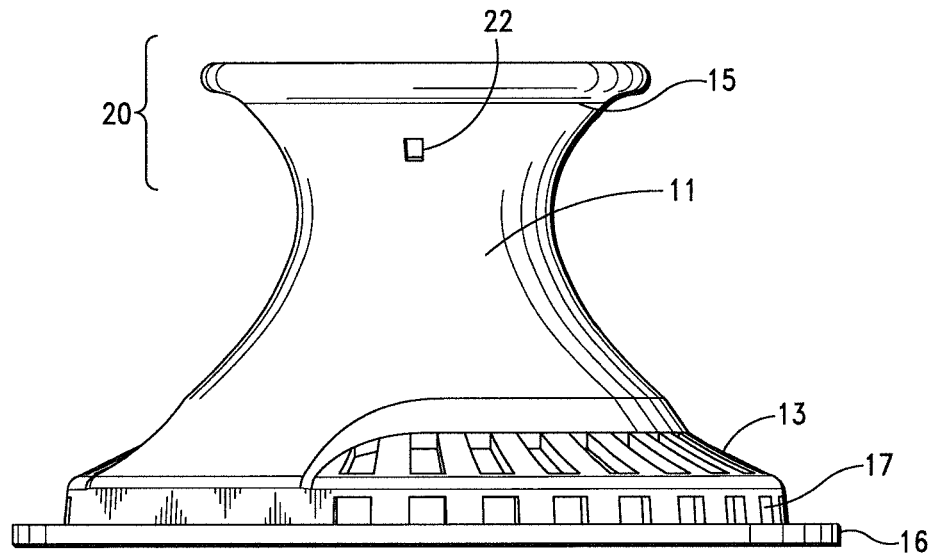
FIG. 6: Side View of Sieve System Assembled (including vent piece)
Figure 7:
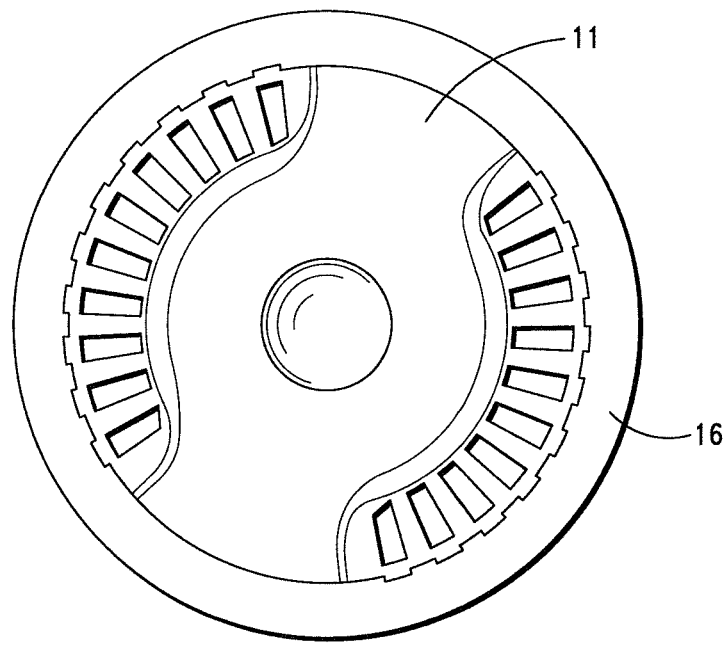
FIG. 7: Bottom View of Sieve System, not assembled with vent piece
Figure 8:
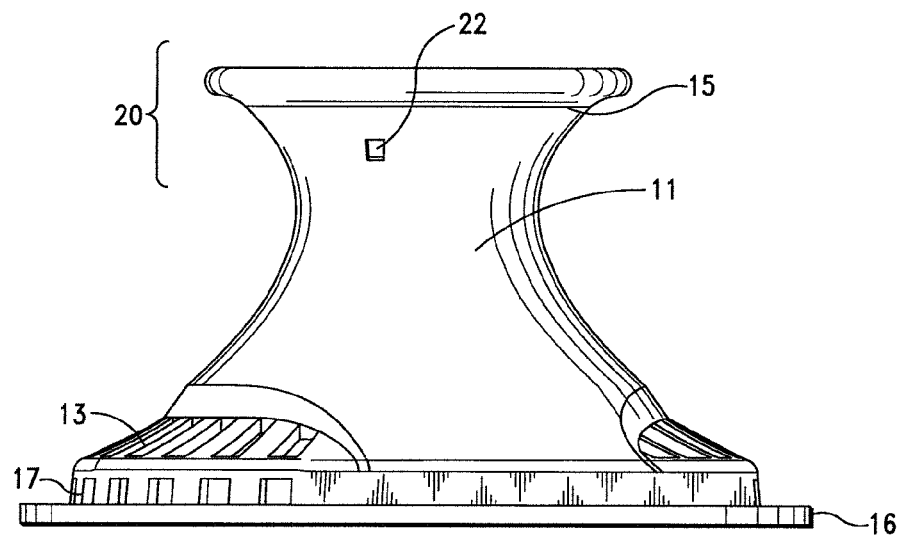
FIG. 8: Side View of Sieve System, not assembled with vent piece

As shown in FIG. 3, when assembled, the vent piece 14 is inserted into the shroud 11 to form the sieve system 24. The vent piece 14 and shroud 11 can be sealed to each other by any means known in the art, for example, such as a snap-fit, interference fit or welded fit.

Referring to FIGS. 3-8, the handle 15 of the shroud includes a thumb rest 21 and handle drainage holes 22. The thumb rest 21 may be surrounded by a moat like depression area and the handle drainage holes located adjacent the moat like depression. The handle drainage holes 22 drain water from the top 20 of the shroud. Standing water could create the potential for bacteria and other microorganisms to grow.

Figure 9:
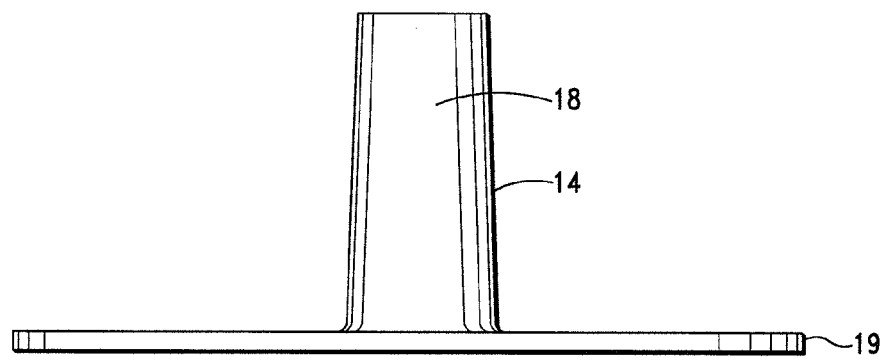
FIG. 9: Side View of Vent Piece
Figure 10:
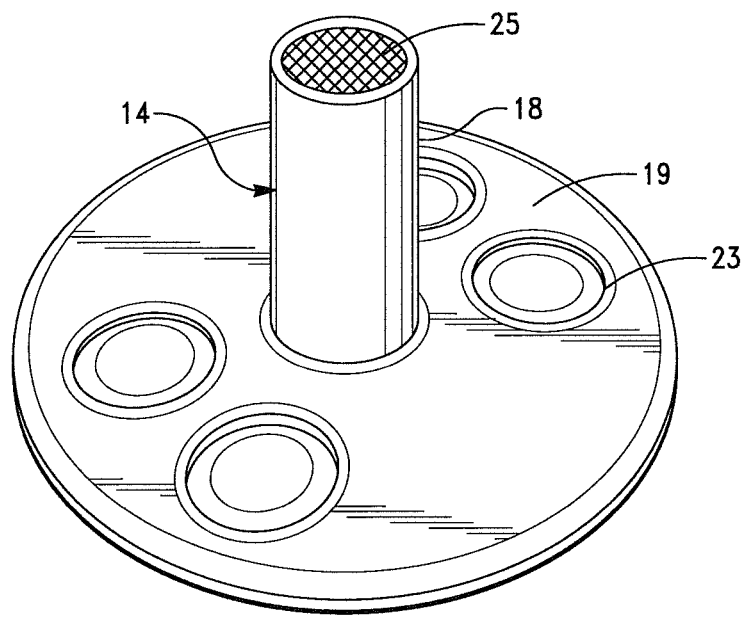
FIG. 10: Top Perspective View of Vent Piece
Figure 11:
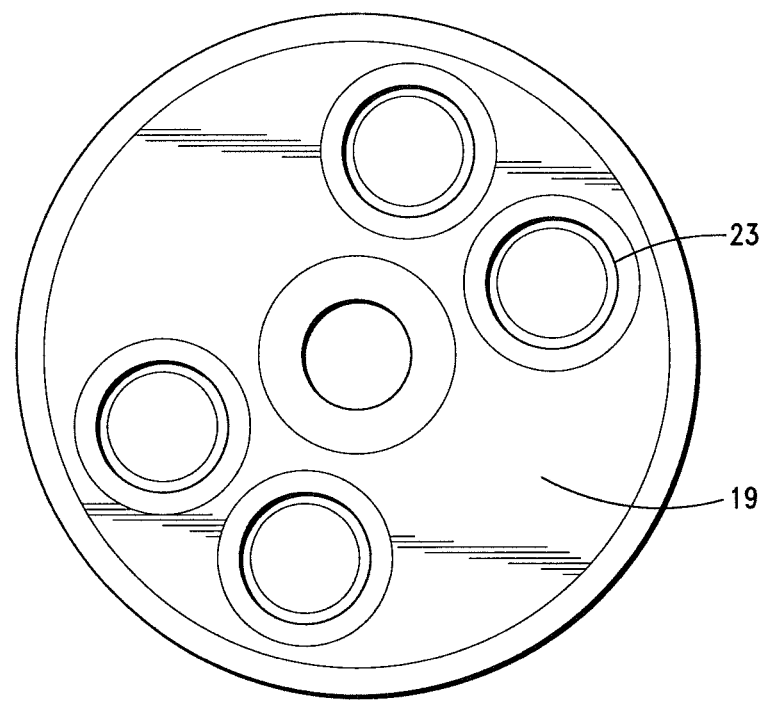
FIG. 11: Bottom View of Vent Piece

Referring to FIGS. 9-11, there is the vent piece 14 of the sieve assembly 24. The vent piece 14 includes an air vent tube 18 and a base portion 19. The base portion 19 may be disk shaped and includes one or more water inlet holes 23. The vent tube water inlet holes 23 may be covered by a screen or nonwoven material (not shown). This may be necessary to help contain the filtration media in the barrel 12. The vent piece 14 vents air from the barrel 12. An air permeable material 25 may cover the opening of the vent piece 14. The air permeable material 25 is selected from a screen, a woven, a nonwoven, or a membrane. The material 25 may be hydrophilic or hydrophobic. A hydrophobic nonwoven is a preferred material. For example, Typar (reg)/Tekton(reg)—spun bond polypropylene—Fiberweb/DuPont. The use of a hydrophobic material breaks the meniscus barrier of water allowing air to vent at very low pressure. The use of a hydrophobic also enables the use of smaller carbon particles as the filtration media because it allows for smaller pore structures not blinded (saturated) by water able to contain smaller carbon particles.

The material 25 is attached to the vent tube 18 by molding the vent tube 18 around the material 25. Alternatively, the permeable material 25 can be glued or the like to the top of the vent 18. Hydrophobic material resists wetting even with some water contact. If the hydophobic membrane is wetted, air may not properly vent from the system when water is being filtered. Accordingly, pressure necessary to vent air through the wetted (saturated) material 25 is greater than the downward force (head pressure) compressed inside the vent tube 18 and the head space.

Those of skill in the art will appreciate that many different shapes and contours can be used consistently with the inventive subject matter disclosed herein.

Figure 12:
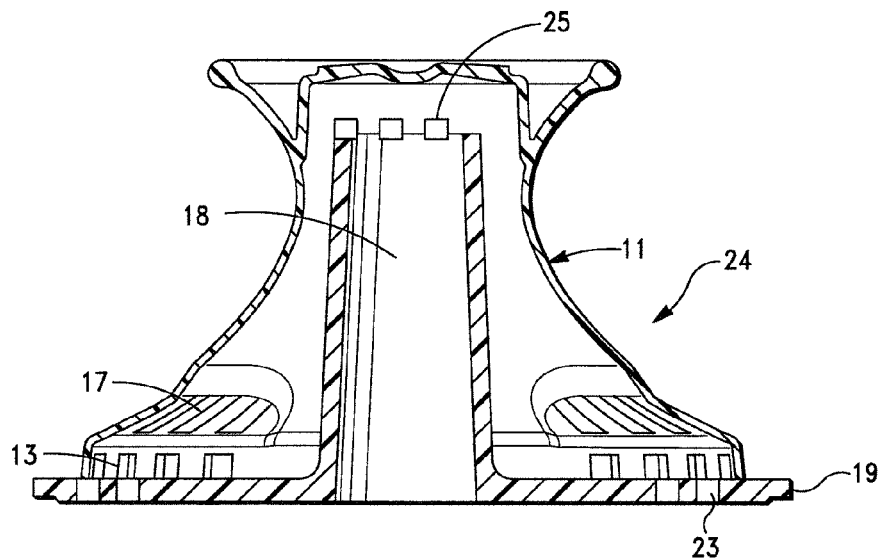
FIG. 12: Water and Air flow through Sieve System, assembled with vent piece
Figure 12:
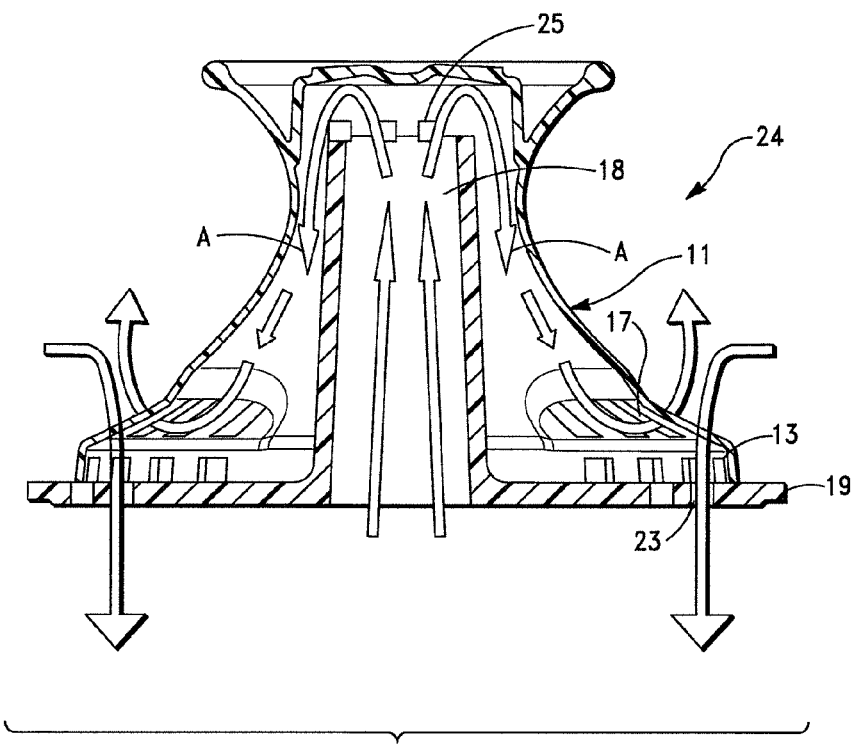
Figure 13:
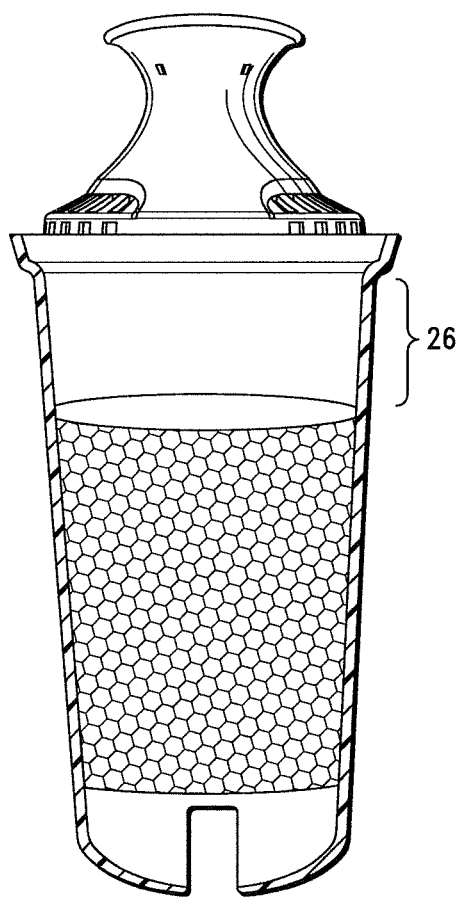
FIG. 13: Water filtration cartridge filled with filtration media.

As represented in FIGS. 12 and 13, water enters the water filter cartridge 10 through the shroud inlet holes 13, 17. Air from the headspace 26 and interstitial pockets of the carbon vents through the vent tube 18 and, consequently, through the material 25 at the top of the vent tube 18. Air is routed downwardly by the sidewalls of the shroud A and finally exits via the inlet holes 13, 17. It should be noted that the inlet holes 13, 17 also function as air outlet holes. There are no inlet/outlet holes above the material 25. This keeps the material 25 dry. The downwardly flow of air inside the shroud 11 also helps keep the material 25 dry. The differential in height between the inlets 13, 17 and the top of the vent tube 18 allows air to vent when the head pressure drops sufficiently. If air trapped in the barrel 12 is not properly vented, water will not flow or flow very slowly. This is commonly known to those skilled in the art as "air lock".

Activated carbon from any source can be used, such as that derived from bituminous coal or other forms of coal, or from pitch, bones, nut shells, coconut shells, corn husks, polyacrylonitrile (PAN) polymers, charred cellulosic fibers or materials, wood, and the like. Activated carbon granules can, for example, be formed directly by activation of coal or other materials, or by grinding carbonaceous material to a fine powder, agglomerating it with pitch or other adhesives, and then converting the agglomerate to activated carbon. Coal-based or wood-based activated carbon can be used in combination or separately, e.g., 90% coconut carbon and 10% bituminous carbon. The activated carbon may be chemically modified and/or impregnated.

The mesh size of the activated carbon is approximately 10×18 U.S. mesh. In another embodiment, the mesh size of the activated carbon is approximately 18×40 U.S. mesh. In another embodiment, the mesh size of the activated carbon is approximately 20×50 U.S. mesh. In yet another embodiment, and preferably, the mesh size of the activated carbon is approximately 20×80 U.S. mesh.

The barrel 12 should be filled with filtration media at a volume of about 50-95% of the barrel 12 volume. Alternatively, the barrel 12 is filled so that 1-2 vertical cm of air remains between the top of the activated carbon and the bottom of the shroud 11. Preferably, the barrel 12 is filled so that 1 vertical cm of air remains between the top of the activated carbon and the bottom of the shroud 11.

EXAMPLES

Embodiments of the present invention are further illustrated by the following examples. The examples are for illustrative purposes only and thus should not be construed as limitations in any way.

All scientific and technical terms employed in the examples have the same meanings as understood by one with ordinary skill in the art. Unless specified otherwise, all component or composition percentages are "by weight," e.g., 30 wt %.

Example I

An Air-locking Filter

Example 1 exemplifies a filter air locking and flowing erratically with a sieve design that basically only includes a vent piece, including a vent tube and water inlets on the base portion, and a standard screen glued to the top of the air vent; no shroud.

The filter configuration was as follows: 65 g of 20×50 activated carbon was filled into the barrel of a commercial BRITA water pitcher cartridge barrel. The vent piece was sealed to the barrel. 220 µm nylon screen from Sefar AG, Switzerland, was attached to the water inlets on the base portion of the vent piece and at the top of the vent tube. The carbon was wetted with 14.4 g of water prior to placing it in the barrel. The filter was not soaked prior to pouring water through it in the pitcher. The cartridge was installed in a BRITA® Slim™ pitcher and 1 L of water was added to the upper reservoir for filtering.

Fifteen separate 1 L batches of water were tested. 1 L batches were poured into the top reservoir, and then a timer was started. The water was allowed to flow through the filter into the bottom reservoir. The timer was stopped when the water meniscus broke away from the walls of the upper reservoir of the pitcher. 5 L of water was tested per day, and the testing for the data below took a total of 3 days. At the end of day 1, 5 L was filtered and the bottom reservoir of the pitcher was stored with the filtered water in the bottom overnight. Same process at the end of filtering 10 L/15 L on day 2/3 respectively.

|  | Filter A (min/L) |
|---|---|
| 1 | 32:32 |
| 2 | 14:21 |
| 3 | 8:36 |
| 4 | 9:39 |
| 5 | 23:30 |
| 6 | 7:08 |
| 7 | 6:40 |
| 8 | 6:44 |
| 9 | 11:02 |
| 10 | 15:32 |
| 11 | 6:49 |
| 12 | 8:10 |
| 13 | 9:27 |
| 14 | 27:14 |
| 15 | 30:11 |

The data indicates that the filter experienced air-locks because there were liters of water that took much longer to flow (ie. Nos. 5, 10, 14 and 15) once the filter was wetted out (ie., after day 1). Consumer acceptable filtration rates are around less than 15 mins.

Example II

Non Air-locking Filter

Example II exemplifies a filter flowing with the novel sieve system described herein and no air-lock issues were experienced.

The filter configuration was as follows: 65 g of 20×80 activated carbon was filled into the barrel of a commercial BRITA water pitcher cartridge. The novel sieve system described herein was sealed to it. 125 μm nylon screen from Saati (USA), Somers, N.Y. was attached to the water inlets on the base portion of the vent piece and hydrophobic nonwoven from Fiberweb, Old Hickory, Tenn. was placed at the top of the vent 14. The hydrophobic nonwoven was Typar™ 3301 made by Fiberweb. The carbon was pretreated to 17% moisture prior to putting it in the barrel, and water was then added to bring the carbon moisture to 32% moisture. Before the filter was put in the pitcher, it was soaked upright in 1" of water for 15 minutes. The water flow rate and method of testing was as described in Example I.

|    | Filter B (min/L) |
|----|------------------|
| 1  | 37:22            |
| 2  | 25:35            |
| 3  | 23:32            |
| 4  | 19:33            |
| 5  | 18:41            |
| 6  | 12:53            |
| 7  | 14:09            |
| 8  | 14:29            |
| 9  | 13:59            |
| 10 | 13:46            |
| 11 | 10:53            |
| 12 | 10:48            |
| 13 | 10:58            |
| 14 | 10:57            |
| 15 | 11:02            |

The data shows that this filter flows successfully because there are no unexpected higher flow rates after the initial wetting out of the filter (ie., after day 1).

We claim:

1. A water filter housing cartridge comprising:
   a) a top portion comprised of a sieve system comprising:
      i) a shroud including a top portion and a bottom portion with water inlet holes located about a periphery of said bottom portion; and
      ii) a vent piece including an air vent tube with an opening at the top and connected to and adjacent a base portion with water inlet holes located on said base portion;
   b) a bottom portion comprised of a barrel; and
   wherein said cartridge is a gravity flow water filter housing cartridge; and
   wherein the opening of the vent tube is located relative to the water inlet holes of the shroud bottom portion to provide a differential in height sufficient to create an air pocket and vent air from filtration media contained within the barrel through the water inlet holes of the shroud bottom portion when head pressure drops sufficiently.

2. The water filter of claim 1, wherein an air permeable material selected from the group consisting of a screen, a woven, a nonwoven or a membrane covers the opening of the vent tube.

3. The water filter of claim 2, wherein the air permeable membrane is hydrophobic.

4. The water filter of claim 1, wherein the bottom portion of the shroud includes a flange and a second set of water inlet holes adjacent the flange.

5. The water filter of claim 1, wherein the shroud top portion further comprises a handle with an undercut side surface, a thumb rest and handle drainage holes for draining water from above the undercut side surface.

6. The water filter of claim 1, wherein the shroud and vent piece are made of a material selected from polypropylene, polyethylene and PVC.

7. The water filter of claim 1, wherein said base portion of the vent piece water inlet holes are covered by a material selected from a screen or nonwoven.

8. The water filter of claim 1, wherein said base portion is a disk like shape.

9. The water filter of claim 1, wherein the water filter cartridge is installed in a water pitcher.

10. The water filter of claim 1, wherein said barrel is filled with activated carbon.

\* \* \* \* \*